United States Patent [19]

Brandt et al.

[11] Patent Number: 4,487,694

[45] Date of Patent: Dec. 11, 1984

[54] DEVICE FOR REMOVING IMPURITIES FROM THE SURFACE OF LIQUIDS

[75] Inventors: Manfred Brandt; Viktor Kurmis, both of Bremen, Fed. Rep. of Germany

[73] Assignee: ERNO Raumfahrttechnik GmbH, Bremen, Fed. Rep. of Germany

[21] Appl. No.: 194,836

[22] Filed: Oct. 7, 1980

[30] Foreign Application Priority Data

Oct. 11, 1979 [DE] Fed. Rep. of Germany ....... 2941187

[51] Int. Cl.$^3$ ............................................... E02B 15/04
[52] U.S. Cl. .................................. 210/242.3; 210/923
[58] Field of Search ................... 210/923, 242.1, 242.3

[56] References Cited

U.S. PATENT DOCUMENTS

| | | | |
|---|---|---|---|
| 3,708,070 | 1/1975 | Bell | 210/923 |
| 3,822,789 | 7/1974 | Chuafulli | 210/242.3 |
| 3,875,062 | 4/1975 | Rafael | 210/242.3 |
| 3,884,807 | 5/1975 | Heddm | 210/242.3 |
| 3,966,615 | 6/1976 | Petchul et al. | 210/923 |
| 4,165,282 | 8/1979 | Bennett et al. | 210/242.3 |
| 4,178,247 | 12/1979 | Janson | 210/242.3 |

Primary Examiner—Thomas Wyse
Attorney, Agent, or Firm—Ralf H. Siegemund

[57] ABSTRACT

A device for skinning spilled oil from a water surface includes a container being open at the front and having hydrodynamically stabilized, float-controlled shear flaps whose sharp front edge "shears" off an oil layer from the water and guides it onto a steadying surface having flow-through openings for water collected and dammed up until permitted to be discharged through bottom apertures by float-controlled barriers. The oil is collected in a tank in the rear from which it can be pumped into a mother ship which tows the container.

7 Claims, 4 Drawing Figures

DEVICE FOR REMOVING IMPURITIES FROM THE SURFACE OF LIQUIDS

The invention relates to a device for removing impurities from the surface of liquids, particularly, for removing hydrocarbons on water surfaces, by means of a floatable container being open at its front and being movable through the liquid on its own accord or by application of an external force.

Devices of the aforementioned kind are known which devices are employed particularly for the removal of oil spilled from the tanks following a tanker disaster. One of the main difficulties here is to separate to a sufficient degree the oil from water on which it floats before this oil can be taken on in the tanks of auxiliary vessels, otherwise the quantities to be handled are too large. However, this separation of oil from water underneath has not yet been successfully accomplished by means of known devices so that the scooped-up oil must be processed in a correspondingly expensive manner.

BACKGROUND OF THE INVENTION

One of the devices for a ship which have become known for collecting the impurities on a free water surface provides a feed channel in front of the ship for scooping up a more or less thick surface layer of the water to be cleansed The thickness of the layer is determined thereby by means of a float-controlled peeling body which restricts to a larger or smaller extent the feed channel entrance opening. The solution proposed here, serving for limiting the inflow of a relatively thin oil layer that floats on the water, is disadvantaged by the fact that water is dammed up in front of the peeling body so that the dammed-up water will to some extent enter the channel after all.

Another proposal provides the entire front of a flat, open ship as an intake opening being partitioned into many small cavities which are situated next to each other and above each other and are individually openable. Here, those cavities are to be closed which are situated below the oil film so that only the relatively thin oil film itself may enter the collecting container. The same reservations are valid here because, due to water damming in front of the closed cavities, water will overflow together with the oil film thereon.

DESCRIPTION OF THE INVENTION

It is an object of the present invention to avoid these known drawbacks in such a manner that the water is actually separated from the oil as floating thereon without capturing undue amounts of water due to damming so that a device can be provided which captures impurities as completely as possible while separating effectively and with certainty the oil from the water underneath.

In accordance with the invention, this object is accomplished in that is to be used a container being open at the front and as is known per se, the container being movable through the liquid on its own force or by means of externally applied force, a sharp edge shear flap is fastened to the front of the container by means of a hinge between the side walls and at the bottom of the container, the bottom being upwardly inclined in the direction toward the front, and that this shear flap is provided with a rearward extension serving as a stabilizing surface form at an obtuse angle of about 150° to 160°.

A steadying surface is advantageously provided in about the level of the shear flap, above the bottom of the collection container, the steadying surface having flow-through openings for the water flowing over the shear flap together with the contaminants. The flow-through openings establish a passage to the discharge openings in the bottom of the container. Preferably, paring flaps are provided in the steadying plane, behind the flow-through openings, which flaps are provided at their front edge with an angled-off blocking wall serving as bulk head when in resting position. These blocking walls posses advantageously a height which corresponds to the distance between the upper side of the bottom of the container and the steadying plane. A collection tank with a suction pump is provided ahead of the rear wall of the container, to receive the contaminants.

It is of advantage to connect the shear flap as well as the paring flaps to the float in a rigid manner, the floats control the elevational position of the flaps. It is of advantage to construct the float holders to be adjustable in length and to mount the floats onto these holders for adjustment in height. The floats for the paring flaps are provided as control elements for the discharge of the water through the discharge openings.

The side wall and the bottom of the container should be of double-wall construction as is known per se in order to obtain buoyancy chambers for rendering the entire device floatable.

In a preferred embodiment, the containers are constructed as cleaning devices which can be launched from a mother ship, whereby, on the one hand, the propulsion of the containers is provided by the mother ship while, on the other hand, the contaminants to be pumped out of the collection tanks can be received in collection containers in the mother ship. In conjunction therewith, it can be of advantage to construct the front part of the side walls of the containers and the shear flap being movably disposed between the side walls, so that a nozzle-shaped intake for the container is formed therewith.

The advantage of the inventive construction of collection containers for purposes of cleaning water surfaces is primarily to be seen in the fact that a separation of the water from the oil floating thereon is produced by the float-controlled, sharp edge shear flap, without causing unnecessary water to enter the collection container by any damming at the front. The "sheared-off" oil passes into the collection container together with, at the most, a thin water layer while, actually, the water is immediately directed into the area below the collection container. A rearward capsizing of the shear flap is avoided here by the stabilizing surface being connected to the shear flap. A particular fine adjustment of the flaps is made possible by height adjustability of floats on the shear flap as well as on the paring flaps in the steadying plane so that an almost complete mechanical separation is obtained between water and contaminating layer.

DESCRIPTION OF THE DRAWINGS

A device in accordance with the invention is illustrated schematically in the appended drawings, and they show in FIG. 1 a longitudinal section through a device in accordance with the invention;

FIG. 3 a detail of the shear flap of the invention; and

FIG. 4 schematically a top elevation of possible employment of the inventive device.

Figure 1:
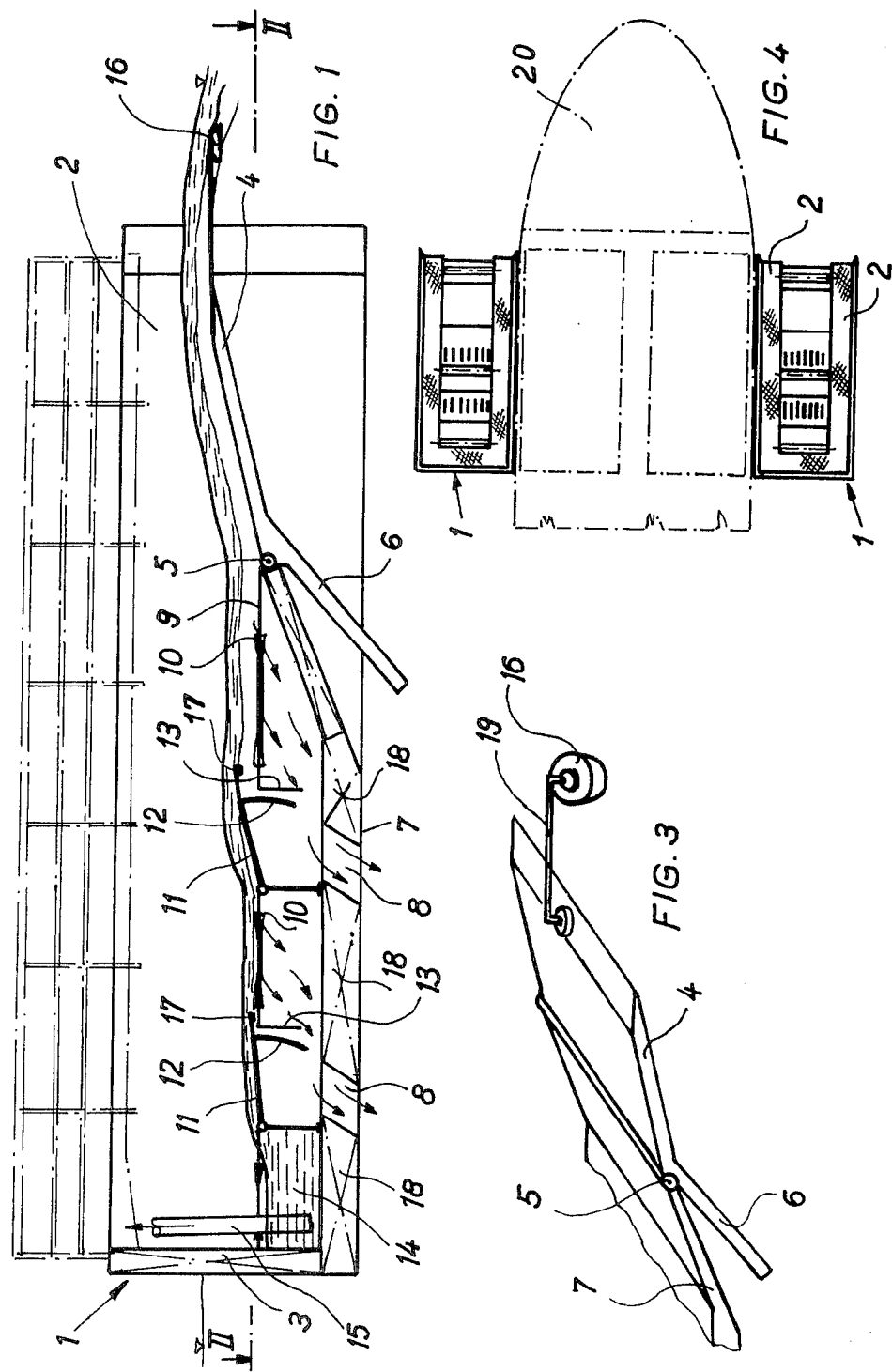
Figure 2:
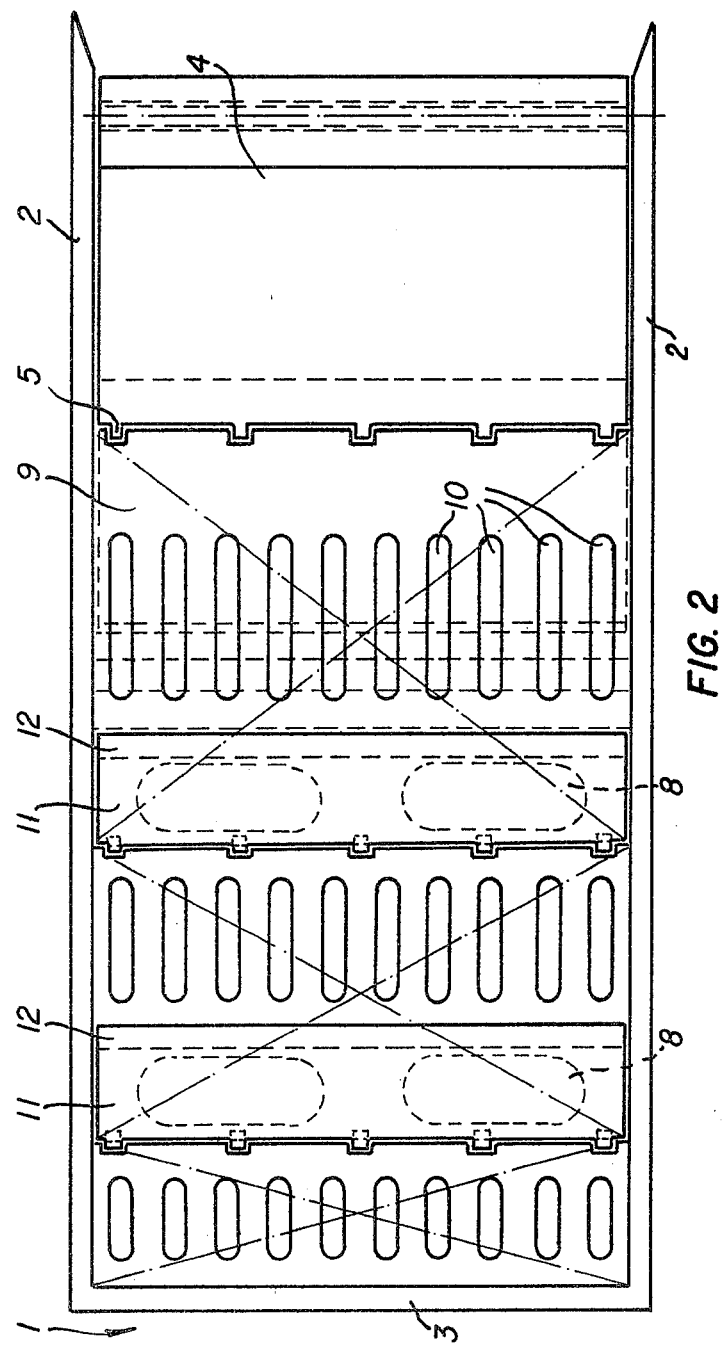
FIG. 2 a cross section in FIG. 1 in the level of the section line II/II.

The device in accordance with the invention is comprised of a collecting container 1 with double walls 2 and the rear wall 3 as well as a likewise double bottom 7 which is angled off upwardly, in about the center and at an obtuse angle. A sharp edge shear flap 4 is fastened to the front of this bottom 7 by means of a hinge 5. The flap 4 is provided with a rearward extension 6 serving as a stabilizing surface. An intermediate bottom is provided as steadying plane 9 above bottom 7 in about the level of the hinge 5. A plurality of flow-through openings 10 are provided in the intermediate bottom. A paring flap 11 having an angled-off blocking wall 12 is pivotally fastened respectively behind the flow-through openings 10 in the steadying plane. This blocking wall 12, when in resting position, partitions in bulk head fashion the space between the steadying plane 9 and the upper side of bottom 7, in front of the discharge openings 8 being provided in bottom 7. The shear flap 4 as well as the paring flap 11 are secured respectively to the floats 16 and 17 by means of rigid holders 19, the holders 19 are advantageously variable in length and the disposition of the floats 16 and 17 is variable in height. A collection tank 14 with a pump is provided behind the quieting plane 9.

Reference numeral 18 refers to buoyancy tanks under the container bottom 7 so that the bottom configuration is of the double-bottom type. As stated, the side walls 2 are also of the double- or twin-wall type, there being similar buoyancy tanks provided in between.

The devices in accordance with the invention are advantageously constructed as devices which can be launched from a mother ship 20, whereby the devices to be used, for example, as illustrated in FIG. 4, can be launched on both sides of the mother ship and together with ship they can be dragged through the liquid to be cleansed.

The device in accordance with the invention operates as follows:

If the inventive device is launched into the liquid to be cleansed and is being moved therethrough, a surface layer of this liquid will enter the collecting container through the open front, provided the sharp front edge of the shear flap 4 is held underneath the surface of the liquid by means of the float 16 on the holder 19 of the shear flap 4. The thickness of the entering layer depends now exclusively upon the adjustment of the float. The float will be adjusted so that in addition to the layer of contaminants to be removed, e.g., the oil film floating on the water, only a water layer, being as thin as possible, will also enter the collecting container. After the layer being comprised of oil and water has flown onto the steadying plane 9, this mixture will at first pass through the flow-through openings 10 into the cavity underneath the steadying plane 9. A discharge through the openings 8 in bottom 7 is at first prevented by the blocking wall 12 of the paring flap 11 behind that cavity. Only after the first cavity has been filled, the mixture entering the collecting chamber will flow across the first paring flap 11, over the steadying plane and further in direction of the collecting tank 14. This filling of the cavity under the steadying plane 9 will occur again in the same manner as in the case of the first cavity until finally the oil film enters the collecting container 14.

The paring flap 11 with its blocking wall 12 now has the task of opening the passage in the direction of the discharge openings 8 after the respectively preceding cavities have been filled and to such an extent that the water collected in the cavities can be discharged through these discharge openings 8 out of the collecting container. For this, the paring flaps are likewise controlled by floats whose task and effectiveness corresponds to those of shear flap floats 16 vertical partitions 13 restrict the flow of water from the space immediately underneath the flow-through openings 10 toward the discharge openings 8. Since the oil layer will float on top also in these cavities, the oil will be removed first after the cavities have filled, the removal will occur through the same flow-through openings through which the oil layer entered the cavities originally. A plenum chamber is created in front of the blocking wall, above the steadying plane, after the filling of the cavities and by means of lifting the paring flaps 11. This plenum, however, relates generally only to the thin water layer upon which floats the oil film to be removed. This way, a further mechanical separation of the oil film to be removed from the residual water is compelled in addition to the shear effect of the sharp edge of the shear flap 4, so that only very little water will be present in the collecting tank in addition to the oil to be removed. This way, the desired separation of the contaminants from the clear water is made possible so that further processing does not appear to be necessary.

The size of the inventive devices can be selected so that they can be transported conveniently on so-called mother ships for being tied in an outboard position only at the location of service so as to be towed by the mother ships themselves through the water to be cleansed, whereby the mother ships possess the requisite tank space for the contaminants such as oil floating on the water.

We claim:

1. Device for the removal of contaminants on the surface of liquids, such as hydrocarbons on water surfaces; comprising:

a floatable container having an open front and provided for moving or being moved through the liquid at the surface thereof, the container having side walls and a bottom, the bottom having a portion upwardly inclined toward the open front, the container provided for flowthrough of the liquid with a free surface;

a shear flag having a sharp front edge;

hinge means for mounting the flag with its edge facing toward the open front;

floating means affixed to the flag and extending forward thereof, toward the oncoming flow of liquids for floating on the liquid surface and determining thereby the pivotable disposition of the flap so that the sharp edge is held in about an interface between the contaminant and the liquid;

an extension on the flap, extending rearward from said pivot axis to provide for stabilization of the flap; and means for steadying flow of liquid over the shear flap, being disposed downstream from the shear flap and in approximately a level of said hinge means.

2. Device as in claim 1, the means for steadying being provided with flow-through openings, the bottom having discharge openings.

3. Device as in claim 1 or 2, the flow steadying means including pivotable paring flaps.

4. Device as in claim 3 to the extent it depends upon claim 2, said paring flaps being provided with blocking walls closing off said discharge openings in a resting position, but opening them in an operating position.

5. Device as in claim 4, and including floats connected to the paring flaps to cause them to pivot in dependence upon a filling state of space underneath the respective paring flap and above the said bottom.

6. Device as in claim 4, the blocking walls having heights corresponding to a distance of the steadying means from the bottom.

7. Device for skinning oil from the surface of open water, comprising:

a container having an open front and a bottom, a front portion of the bottom being upwardly inclined;

partition means extending from an upper portion of the bottom and defining cavity space between the partition means and the bottom;

flow-through openings in the partition means;

discharge openings in the bottom;

float-controlled means for opening and closing the discharge openings as to flow entering cavity space under said partition means;

a shear flap hinged to said upper portion, having a stabilizing surface and a sharp edge in the front facing flow of water and oil when entering the front of the container; and float means fixed to the shear flap for maintaining said sharp edge in about an interface between said oil and said water, said partition means steadying flow of oil and of some water as flowing over the flap.

* * * * *